June 19, 1951 W. E. SCHOTH 2,557,235
FAN ATTACHMENT FOR HARVESTING COMBINES
Filed March 17, 1950
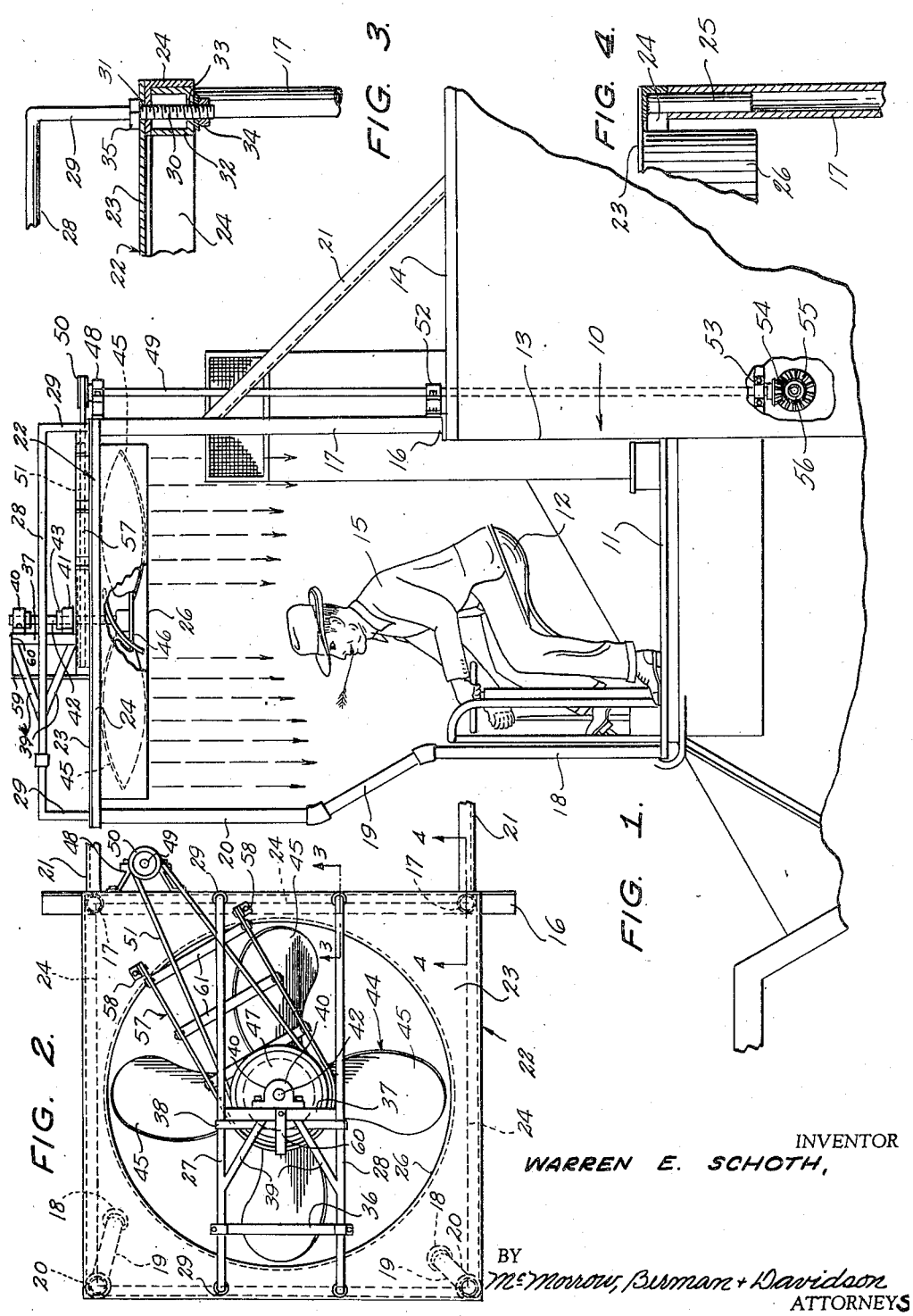
INVENTOR
WARREN E. SCHOTH,
BY McMorrow, Burman + Davidson
ATTORNEYS Patented June 19, 1951

2,557,235

UNITED STATES PATENT OFFICE 2,557,235

FAN ATTACHMENT FOR HARVESTING COMBINES

Warren E. Schoth, Elkhart, Ill.

Application March 17, 1950, Serial No. 150,207

2 Claims. (Cl. 230—249)

My invention relates to a fan attachment for a combine.

A primary object of the invention is to provide an air circulating fan attachment for self-propelled combines, the attachment serving to protect the operator of the combine from the usual dust and dirt which surrounds him during the harvesting operation.

A further object of the invention is to provide a fan attachment for combines constructed and arranged to create a down draft of fresh air from directly above the operator which will circulate about the operator, so that he will be placed in a dirt and dust free atmosphere.

A further important object of the invention is to provide a fan attachment of the above-mentioned character which is highly simplified, compact and extremely sturdy in construction, and which may be installed upon a conventional, self-propelling combine without modifying the structure of the combine materially.

A further object is to provide a fan attachment of the above-mentioned character which, when installed upon combines, will constitute an important safety feature for safeguarding the health of operators.

A still further object of the invention is to provide a fan attachment of the above-mentioned character which is very easy to install upon or remove from a combine, and which will have the effect of increasing the over-all efficiency of operation of the combine.

Other objects and advantages of the invention will be apparent during the course of the following description.

In the accompanying drawings forming a part of this application, and in which like numerals are employed to designate like parts throughout the same:

Figure 1 is a fragmentary side elevational view of a conventional combine equipped with a fan attachment embodying my invention;

Figure 2 is a fragmentary plan view of the same;

Figure 3 is an enlarged fragmentary vertical sectional view taken on line 3—3 of Figure 2; and Figure 4 is a similar sectional view taken on line 4—4 of Figure 2.

In the drawings, where, for the purpose of illustration, is shown a preferred embodiment of the invention, the numeral 10 designates generally the forward portion of a conventional harvesting combine, such as a Massey-Harris self-propelled combine, and including the usual horizontal front operator's platform 11 having a suitable operator's seat 12 mounted thereon. The various combine controls are arranged adjacent to the seat 12 and at the forward side of the platform 11 in a well known manner, as shown. The main body portion 13 of the combine 10 is arranged rearwardly of the platform 11, and includes a generally flat, horizontal top 14 arranged at an elevation somewhat above the seat 12, as shown.

I mount my fan or air circulating attachment directly above the platform 11 and seat 12, so that fresh air will circulate downwardly and about the operator 15 who is seated at the forward end of the self-propelled combine.

The body portion 13 may be substantially cylindrical, as viewed from the top, and a transverse, horizontal mounting bar or rail 16 is suitably rigidly secured to the top 14 of the body portion 13 adjacent to the forward edge of the body portion, as shown. The mounting bar 16 extends transversely of the platform 11, as shown, and is arranged rearwardly of the operator's seat 12. The bar 16 extends transversely upon opposite sides of the seat 12 and is preferably about four feet long, although this length may vary. Rigidly secured to the mounting bar 16 near its opposite ends are a pair of upstanding, vertical pipes or posts 17 having their top ends terminating substantially seven feet above the top of the platform 11, although this distance may be varied, as desired.

A pair of relatively short, upstanding pipes or posts 18 are rigidly secured to the top of the platform 11 at its forward corners, and the posts 18 are substantially vertical and have their tops terminating substantially at the top 14 and somewhat above the seat 12. Rigidly secured to the tops of the posts 18 are short, forwardly inclined and laterally diverging pipe sections 19 having their top ends arranged in longitudinal alignment with the posts 17, but terminating a substantial distance below the tops of the posts 17. The tops of the pipe sections 19 are also disposed forwardly of the platform 11, as shown. Vertical top pipe sections 20 are rigidly secured to the tops of the pipe sections 19 and are arranged in longitudinal and lateral alignment with the posts 17 and have their tops terminating at the same elevation as the tops of the posts 17. Longitudinal, diagonal braces 21 have their top ends rigidly secured to the posts or pipes 17 near the longitudinal centers of the pipes, and the bottom ends of the braces 21 are rigidly secured to the top 14 in any suitable manner.

A horizontal fan support frame 22 is removably mounted upon the tops of the vertical pipes or posts 17 and 20, as shown. This frame 22 comprises a substantially flat, rectangular plate 23 having angle bars 24 or the like rigidly secured to its marginal edges by welding or the like. Short, depending tubes or bars 25 are rigidly secured by welding or the like to the bottom of the plate 23 at the four corners of the plate, and these pipes 25 engage in the tops of the pipes 17 and 20, as shown clearly in Figure 4. The bottom edges of the angle bars 24 may engage the tops of the pipes or posts 17 and 20 to maintain the frame 22 level, as shown. A short, depending, cylindrical wrapper or fan housing 26 is secured to the bottom of the plate 23 centrally of the posts 17 and 20. The top and bottom of the cylindrical wrapper 26 are open, and the plate 23 has a large circular opening which registers with the top open end of the wrapper or housing 26, so that fresh air may be drawn from above the plate 23 downwardly and through the wrapper 26. As shown in Figure 2, the housing or wrapper 26 extends over substantially the entire area of the plate 23, and is arranged slightly inwardly of the angle bars 24. The plate 23, pipes or bars 25 and associated elements thus constitute an integral, rigid unit which may be readily applied to or removed from the tops of the pipes 17 and 20.

A pair of laterally spaced, longitudinal, parallel, fan-support bars 27 and 28 are spaced a slight distance above the top of the plate 23, and are disposed horizontally and extend across the entire length of the plate, Figures 1 and 2. The bars 27 and 28 have integral, depending, vertical end extensions or legs 29, having their bottom ends screw-threaded, as at 30. The plate 23 and the forward and rear, transverse angle bars 24 are provided with registering openings 31 for receiving the depending extension 29 therein, and U-shaped spacers 32 are secured to the bottoms of the forward and rear angle bars 24 adjacent to the extension 29, as shown. The U-shaped spacers 32 are provided in their bottoms with openings 33, which are in alignment with the openings 31 for receiving the bottoms of the extensions or legs 29. Nuts 34 are mounted upon the bottom screw-threaded ends of the legs 29, and below the U-shaped spacers 32, while locking nuts 35 are mounted upon the legs 29 above the plate 23, Figure 3. As shown in Figure 2, the fan mounting bars 27 and 28 are spaced equidistantly upon opposite sides of the transverse center of the plate 23. A transverse, horizontal brace 36 has its opposite ends rigidly secured to the bars 27 and 28 near and inwardly of one pair of the depending legs 29, Figure 2.

A vertically disposed bearing plate 37 is arranged between the bars 27 and 28 near the longitudinal centers of the bars, and rigidly secured thereto by means of a transverse bar or brace 38 and suitable diagonal braces 39. Vertically spaced aligned bearings 40 and 41 are rigidly secured to one side of the plate 37, and a vertical fan spindle or shaft 42 is journaled within the bearings 40 and 41, as shown, and held against downward movement by means of a suitable thrust bearing or collar 43. The bottom end of the shaft or spindle 42 terminates substantially at the vertical center of the wrapper or housing 26, Figure 1, and a large rotary fan 44, including horizontal, circumferentially spaced, radial blades 45, is rigidly secured to the bottom of the shaft 42, as shown. The fan blades 45 extend substantially entirely across the cylindrical wrapper or housing 26, and the outermost tips of the blades are spaced a slight distance only from the housing 26. The innermost ends of the blades 45 terminate radially outwardly of the vertical shaft 42, as shown, and the blades are rigidly secured at their inner ends to a flat, circular disc 46, which is in turn suitably rigidly secured to the bottom end of the shaft 42. The arrangement is such that the fan blades 45 may draw air downwardly from above the plate 23 and force it through the housing or wrapper 26 and toward the platform 11. Since the inner ends of the blades 45 are spaced apart and terminate radially outwardly of the shaft 42, a substantially dead air space will be created near the axial center of the fan 45, and this dead air space is intended to accommodate the head of the operator 15, Figure 1. Radially outwardly of the dead air space the fan blades 45 will circulate the air downwardly and about the operator 15, so that he will be seated in a dirt and dust free atmosphere, with the cool, fresh air circulating continuously downwardly over him and about him. The space or area occupied by the operator's head, however, will be relatively free from turbulence and air currents, due to the fact that the fan blades 45 have their inner ends terminating radially outwardly of the vertical shaft 42.

A relatively large, horizontal pulley 47 is secured to the shaft 42 for rotation therewith between the lowermost bearing 41 and the plate 23. A suitable bearing 48 is rigidly mounted upon the rear angle bar 24 near one corner of the frame 22, Figure 2. This bearing 48 has its bore vertically disposed, for rotatably receiving a vertical shaft 49, having a relatively small pulley 50 secured to its top end for rotation therewith. The pulley 50 is arranged at the same elevation as the pulley 47, and a V-belt 51 connects the pulleys 47 and 50, as shown. An additional bearing 52 is arranged in vertical alignment with the bearing 48 and rigidly secured to the back of the mounting bar 16 near one end of this bar. The vertical shaft 49 is thus journaled near its longitudinal center within the bearing 52, and the shaft 49 projects below the bearing 52 and below the platform 11, and has its lower end journaled within a suitable bearing 53 rigidly secured to the body portion of the combine and arranged in alignment with the bearings 52 and 48. A bevel gear 54 is carried by the bottom end of the shaft 49 and meshes with a second bevel gear 55 mounted upon a horizontal, transverse shaft 56, in turn driven from a gear box of the combine. The arrangement is obviously such that rotation of the shaft 56 will drive the shaft 49, which in turn will rotate the shaft 42 and fan 45.

A horizontally disposed belt guard 57 is provided, and this guard includes outer feet 58 which are rigidly secured to the top of the plate 23. The innermost end of the belt guard 57 is supported by an upstanding, vertical strap or bar 59 having a top horizontal extension 60 rigidly secured to the top of the bearing plate 37, as shown. The guard 57 includes spaced, transverse bars 61 which engage beneath the belt 51 so that under no conditions can the belt sag into contact with the blades 45.

The above-described fan attachment is highly simplified, compact and sturdy in construction. The entire fan supporting frame 22 may be bodily removed from the tops of the posts 17 and 20, as previously stated. As the self-propelled combine travels forwardly, the fan 44 is driven in the manner described, and fresh air is continuously circulated downwardly and about the driver or operator 15, the head of the operator being within a space which is relatively free from turbulence The usual dust and dirt thrown up by the combine is thus eliminated, and the driver or operator is located in a cool, clean atmosphere at all times. It is believed that the device will materially protect the health of the operator.

It is to be understood that the form of the invention herewith shown and described is to be taken as a preferred example of the same, and that various changes in shape, size and arrangement of parts may be resorted to without departing from the spirit of the invention or the scope of the subjoined claims.

Having thus described my invention, I claim:

1. A fan attachment for an agricultural machine including a forward substantially horizontal operator's platform and a body portion arranged rearwardly of the platform and extending above the same, the attachment comprising a pair of relatively short upstanding posts secured to the top of the body portion adjacent to the rear end of the platform and being transversely oppositely disposed and having their top ends terminating at substantially the same elevation, a pair of upstanding forward posts secured to the forward end of the platform and being longer than the first-named posts and having their top ends terminating at substantially the same elevation as the first-named posts, a substantially horizontal fan support frame detachably mounted upon the tops of the first and second-named posts, a large horizontal rotary fan journaled upon the fan support frame and disposed directly above the platform, and mechanical means connected with the fan to drive it.

2. In an agricultural machine, a substantially horizontal operator's platform, upstanding substantially vertical pipes secured to the combine adjacent to the corners of the platform and projecting above the platform for a substantial distance and having their top ends terminating at substantially the same elevation, the top ends of the pipes being open, a substantially horizontal fan support plate disposed adjacent to the top ends of the pipes, corner depending bars secured to the plate and detachably engaging within the open top ends of the pipes for supporting the plate upon the tops of the pipes, the plate being provided with a large opening, spaced substantially horizontal bars mounted upon the top of the plate and spaced above the plate and extending across the large opening of the plate, a generally vertical bearing plate secured to the horizontal bars above the opening of the plate, vertically aligned bearings secured to the bearing plate, a vertical fan shaft journaled within the bearings and extending through the large opening of the plate and below the plate, substantially horizontal fan blades secured to the bottom end of the fan shaft, the fan blades being disposed substantially directly above the platform and extending across the platform, and mechanical drive means connected with the fan shaft to turn it.

WARREN E. SCHOTH.

REFERENCES CITED

The following references are of record in the file of this patent:

UNITED STATES PATENTS

| Number | Name | Date |
| --- | --- | --- |
| 334,684 | Aylworth | Jan. 19, 1886 |
| 491,454 | Trippe | Feb. 7, 1893 |
| 2,230,165 | Prock | Jan. 28, 1941 |